United States Patent [19]

Suwitoadji

[11] Patent Number: 5,038,646

[45] Date of Patent: Aug. 13, 1991

[54] BAND SAW WORKPIECE TRANSPORT MECHANISM

[75] Inventor: Freddy H. Suwitoadji, Phoenix, Ariz.

[73] Assignee: Evans Rotork, Inc., Glendale, Ariz.

[21] Appl. No.: 443,446

[22] Filed: Nov. 29, 1989

[51] Int. Cl.$^5$ .............................................. B26D 3/00
[52] U.S. Cl. .......................................... 83/56; 83/413;
    83/442; 83/565; 144/144 R
[58] Field of Search ................. 83/56, 410, 412, 442,
    83/446, 565, 788, 820, 413; 144/144 R, 144.5

[56] References Cited

U.S. PATENT DOCUMENTS

| | | | |
|---|---|---|---|
| 1,410,972 | 3/1922 | Wagner | 83/410 |
| 2,934,107 | 4/1960 | Hawkins | 83/442 X |
| 3,254,684 | 6/1966 | Hawkins | 144/144.5 X |
| 3,865,162 | 2/1975 | Schmidt | 83/565 X |
| 4,036,269 | 7/1977 | Rhodes | 144/144 R X |
| 4,109,554 | 8/1978 | Rhodes et al. | 83/565 |

*Primary Examiner*—Frank T. Yost
*Assistant Examiner*—Eugenia A. Jones
*Attorney, Agent, or Firm*—Cahill, Sutton & Thomas

[57] ABSTRACT

A jig and workpiece transport mechanism for making a curvilinear cut with a conventional band saw continuously linearly translates and rotationally reorients a jig and an attached workpiece to maintain the saw line at the cutting edge in the workpiece aligned with the band saw blade.

32 Claims, 3 Drawing Sheets

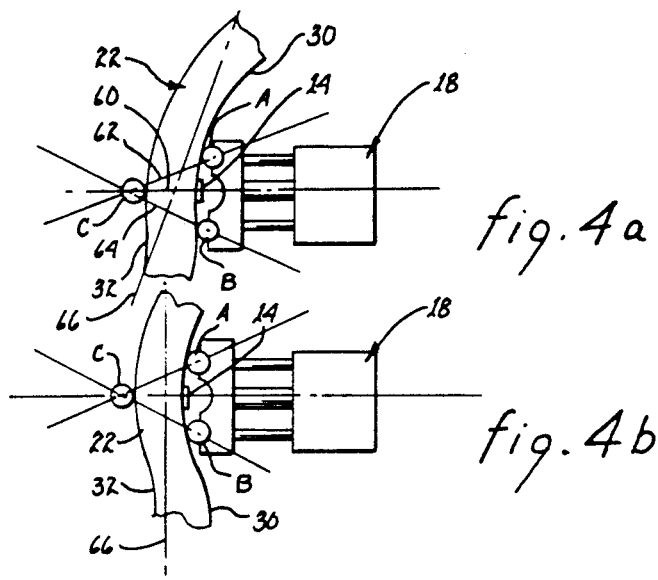
fig. 4a
fig. 4b
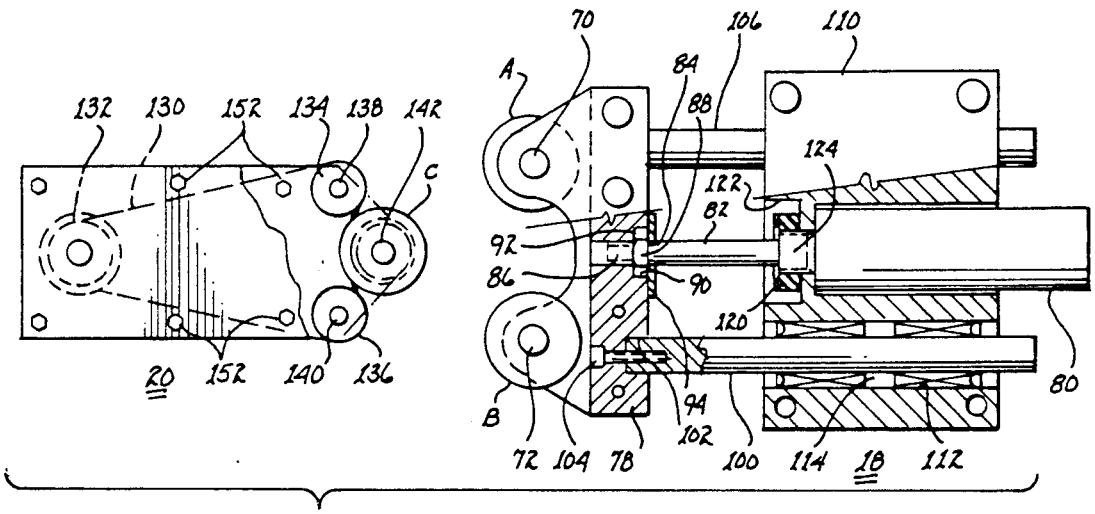
fig. 5
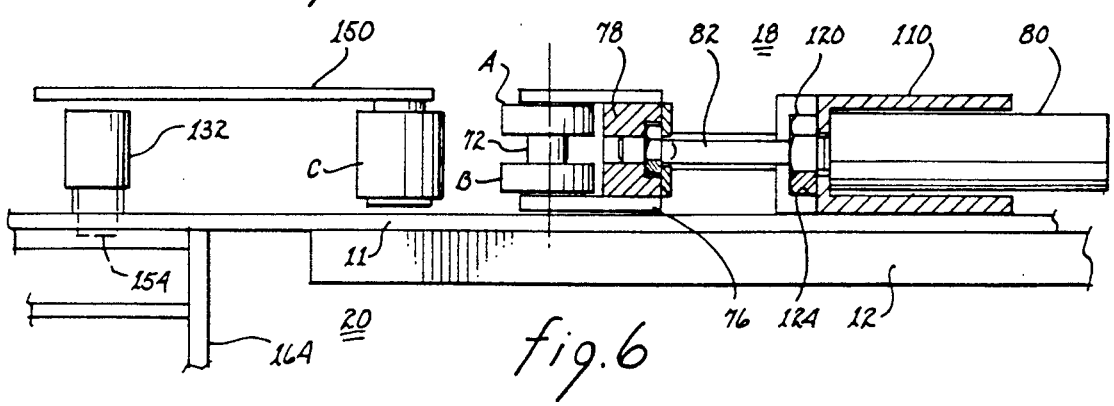
fig. 6

BAND SAW WORKPIECE TRANSPORT MECHANISM

BACKGROUND OF THE INVENTION

1. Field of the Invention

The present invention relates to jigs and, more particularly, to jig and workpiece transport mechanisms for band saws.

2. Description of the Prior Art

In the wood working field, band saws are often used to make curved cuts in a workpiece. Because a band saw blade has a width several times the thickness of the blade, there exists a limiting factor on the degree of curvature that can be cut without a tendency for the blade to bind. To make a curved cut in a workpiece, several techniques have been employed for a number of years. The cut can be made by a workman who rotates the workpiece about a perpendicular axis generally coincident with the axis of the band saw blade extending from the workpiece. Such rotation is performed in combination with translation of the workpiece along the band saw work table and in a plane perpendicular to the axis of the saw blade. The curved cut can be made freehand or in conformance with a curved line disposed upon the workpiece. To make replicate curved cuts in a plurality of workpieces requires a substantial amount of skill and experience; nevertheless, the curved lines cut in such workpieces will not be identical.

To obtain identicality in curved lines cut in each of a plurality of workpieces, very complex computer controlled equipment has been developed. Such equipment is capable of transporting a workpiece past a band saw blade pursuant to a preprogrammed cut line; alternatively or in combination, the band saw blade is moved. This equipment is relatively expensive. It cannot be incorporated in or used with conventional band saws of the type that have been available for decades. Most medium sized and all small sized wood fabricating businesses cannot afford such computer controlled equipment.

SUMMARY OF THE INVENTION

A pair of spring loaded rollers mounted upon a base plate supported on the work table of a conventional band saw urge a jig having duplicate or non duplicate curved surfaces on opposed sides toward a driving roller. The driving roller transports the jig past the band saw blade. During such transport, the spring loaded rollers, being continuously in contact with the curvature changing surface of the jig, will force rotation of the jig and a workpiece attached thereto about a vertical axis coincident with the axis of the band saw blade and the cutting edge of the saw line will be maintained parallel with the band saw blade to avoid twisting of the band saw blade about its longitudinal axis.

It is therefore a primary object of the present invention to provide a workpiece transport mechanism for cutting a predetermined curved line with a band saw blade.

Another object of the present invention is to provide apparatus for automatically making a curvilinear saw cut in a workpiece with a band saw blade.

Still another object of the present invention is to provide apparatus for reorienting a workpiece to prevent twisting of a band saw blade during a curvilinear cut.

Yet another object of the present invention is to provide apparatus for angularly reorienting a jig with an attached workpiece as it is transported past a band saw blade.

A further object of the present invention is to provide a band saw retrofitable workpiece transport mechanism for cutting a curvilinear line in accordance with the curvature of a jig.

A still further object of the present invention is to provide a method for automatically cutting with a band saw blade a curvilinear line in a workpiece.

A still further object of the present invention is to provide a method for transporting and reorienting a workpiece past a band saw blade without a tendency to twist the blade while making a predetermined curvilinear cut.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which:

FIGS. 4a and 4b illustrate reorientation of the jig and attached workpiece during the cutting of a curvilinear line;

FIG. 5 is a combined view illustrating spring loaded rollers in relationship to a driving roller;

FIG. 6 is a side view illustrating the spring loaded rollers and the driving roller;

DESCRIPTION OF THE PREFERRED EMBODIMENT

Figure 1:
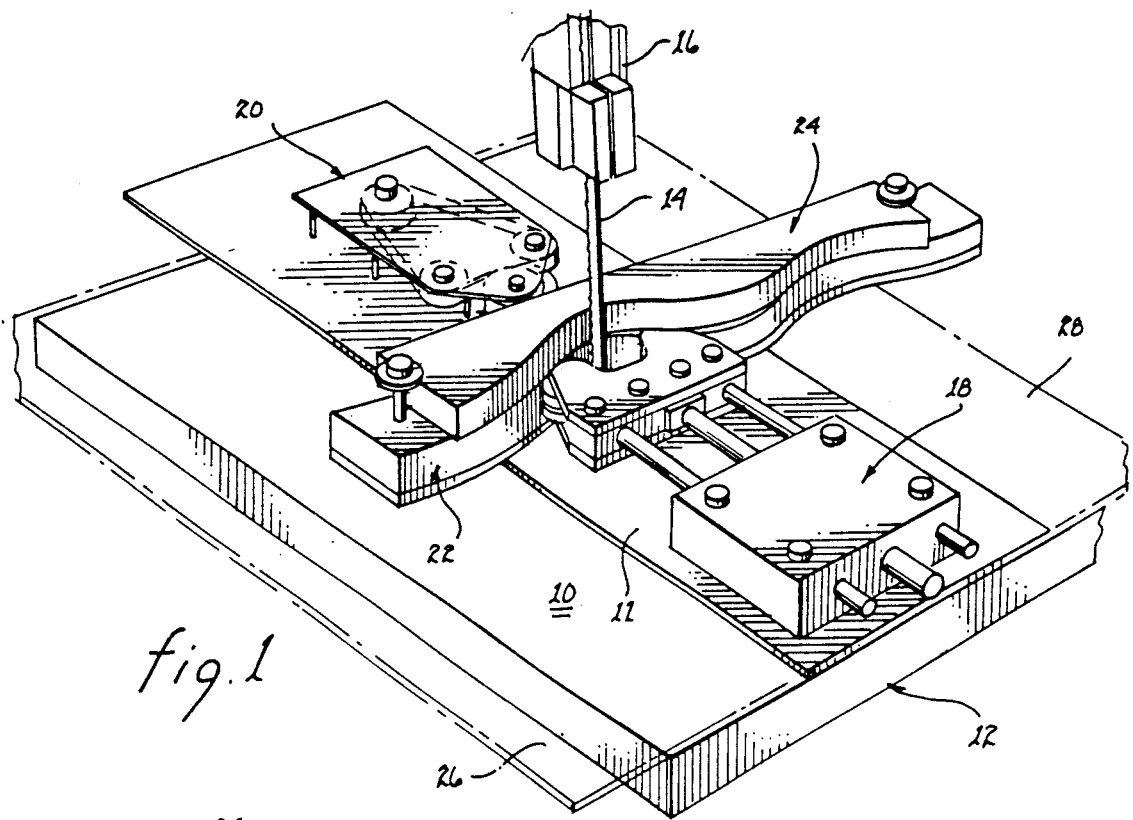
FIG. 1 is an isometric view illustrating the present invention in operation upon the work table of a conventional band saw.

Referring to FIG. 1, there is shown a jig and workpiece transport mechanism lo mounted upon a base plate 11 attached or attachable to a conventional band saw work table 12. A band saw blade 14 extends downwardly from a conventional housing 16 and through an aperture in the work table. A spring biased roller apparatus 18 is mounted upon base plate 11 on one side of the band saw blade. A driving roller mechanism 20 is secured to base plate 11 on the other side of the band saw blade. A jig 22 is supported upon the base plate between the driving roller mechanism and band saw blade 14 and urged against the driving roller mechanism by the spring biased roller apparatus. A workpiece 24, in which a curvilinear cut is to be made, is attached to the jig for movement therewith as the saw cut is being made. To prevent interference between workpiece 24 and the spring biased roller apparatus, the jig extends upwardly from the work table to a height at least equal to, if not greater than the spring biased roller apparatus. For large workpieces, it may be preferable for stability reasons to permit the workpiece to rest upon but be slidable along the top planar surface of the driving roller mechanism. For very large jigs, extensions 26,28

(shown in phantom lines) may be attached to the sides of the base plate to provide additional supporting surface for the jig.

Figure 2:
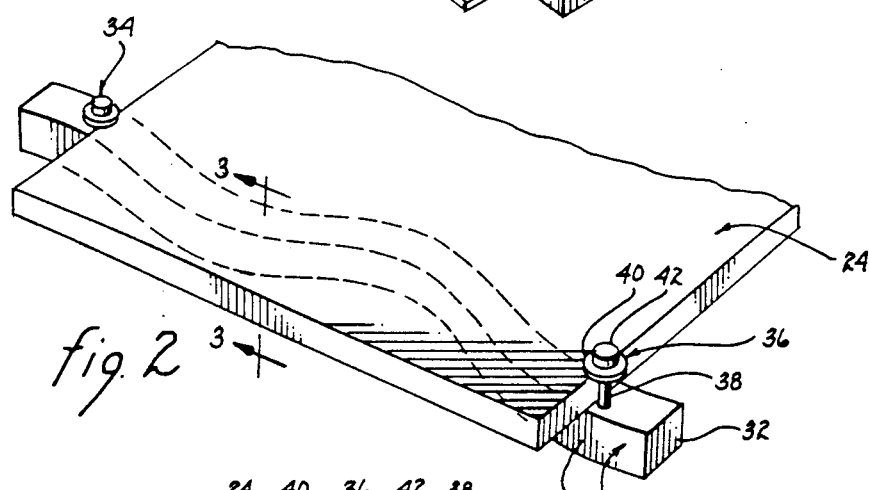
FIG. 2 is an isometric view illustrating a workpiece attached to a jig.
Figure 3:
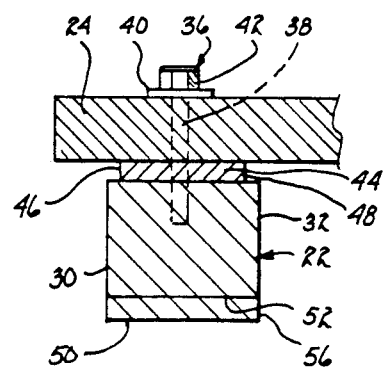
FIG. 3 is a cross sectional view taken along lines 3-3, as shown in FIG. 2.

Referring jointly to FIGS. 2 and 3, certain features of jig 22 will be described. The jig includes a vertical front edge 30 defining, horizontally, the curvilinear line to be cut in workpiece 24. A vertical rear edge 32 of the jig is preferably a curvilinear duplicate of the vertical front edge. Workpiece 24 is secured to jig 22 by clamping means, such as clamps 34,36. The clamps illustrated include a threaded shank 38 for threaded engagement with the jig. A washer 40 is drawn against the workpiece by a head 42 of the shank upon threadedly engaging the shank with the jig. To prevent the possibility of interference between the clamping means and band saw blade 14, the clamping means should not extend laterally past a vertical plane defined by front edge 30. For operator convenience, the clamping means may be lever operated over center clamps or other types of clamps well known in the industry. To protect front surface 3 of jig 22, the width of the jig is preferably approximately a quarter inch less than the spacing between the band saw blade and driving roller C. This spacing will prevent band saw blade 14 from inadvertently contacting the jig and defacing or gouging the front edge of the jig.

As shown in FIG. 3, a spacer 44 may be disposed intermediate jig 22 and workpiece 24 to assure clearance between the workpiece and each of the spring biased roller apparatus and the driving roller mechanism. To prevent cutting of the spacer or interference with band saw blade 14, front surface 46 should not extend beyond front edge 30 and rear surface 48 should not extend beyond rear edge 32. Since jig 22 is slidably transportable upon work table 12, a low friction foot 50 may be attached to bottom surface 52 of jig 22. Again, front surface 54 and rear surface 56 of the foot should not extend beyond front edge 30 and rear edge 32, respectively, of the jig.

Referring jointly to FIGS. 4a and 4b, the theory and practice of the jig and workpiece transport mechanism 10 will be reviewed. Spring biased roller apparatus 18 includes a pair of rollers A and B. These rollers are freely rotatable about their respective axes and urged, in tandem, toward driving roller C. The force exerted by rollers A and B will force jig 22 toward roller C and cause the roller to be in frictional contact with rear edge 32 of the jig. Simultaneously, rollers A and B will bear against front edge 30 of the jig. Band saw blade 14 is centered upon and perpendicular to a line 60 extending through the center of driving roller C and bisecting the angle defined by lines 62,64, which lines extend through the centers of driving roller C, roller A and driving roller C, roller B, respectively. Moreover, each of rollers A and B are continuously maintained equidistant from driving roller C.

After placement of jig 22, with attached workpiece, between driving roller C and rollers A and B, the bias provided by rollers A and B urges the jig against roller C and orients the axis of the jig, as may be necessary, to maintain all three rollers against the respective edges of the jig. In particular, the jig is reoriented about a vertical axis until the forces exerted by each of rollers A and B upon the jig are equal. Upon energization of driving roller C, the driving roller will urge transport of the jig therepast. If, as shown in FIG. 4a, driving roller C rotates clockwise, jig 22 will be drawn downwardly to an intermediate position as shown in FIG. 4b. Due to the change in curvature of front edge 30 (with preferably but not necessarily a commensurate change in curvature of rear edge 32) and the bias provided by rollers A and B, axis 62 of jig 22 will have become reoriented counterclockwise, as illustrated.

In the position of the jig, shown in FIG. 4a, band saw blade 14 is essentially parallel with the adjacent segment of front edge 30. Accordingly, the band saw is in alignment with the jig at the cutting edge of the saw cut being made on a workpiece (not shown) attached to the jig. In the position of the jig shown in FIG. 4b, band saw blade 14 is still essentially parallel with the adjacent portion of front edge 30 even though the segment of the curvilinear cut being made at the position of the jig shown in FIG. 4b is at an angle with respect to that of the cut being made as shown in FIG. 4a. This difference in angle of cut being made with respect to the curvilinear saw cut underway is accommodated by reorienting the jig, as reflected by the change in position of axis 66, and the attached workpiece.

Accordingly, at any point along the curvilinear cut to be made and represented by jig 22, the workpiece is reoriented about a vertical axis coincident with the vertical axis of the band saw blade to ensure that transport of the workpiece past the band saw blade is always along a segment of the curvilinear cut, which segment has been aligned to be parallel with the band saw blade.

Referring jointly to FIGS. 5 and 6, further details of spring biased roller apparatus 18 and driving roller mechanism 20 will be described. Rollers A and B are rotatably mounted upon shafts 70,72 secured to mounting plates 74,76. These mounting plates are rigidly attached to and extend from a front mounting block 78. A pneumatic cylinder 80 includes a plunger 82 extending therefrom to urge movement of mounting block 78, and attached rollers A,B toward driving roller C. Preferably, end 84 of plunger 82 is not fixedly attached to the front mounting block in order to avoid alignment related problems. In example, end 84 may include a threaded shank 86 for threadedly engaging a nut 88. Front mounting block 78 includes a depression 90 for receiving nut 88 and a shoulder 92 bears against the nut. A plate 94, apertured to receive penetrable insertion of plunger 82, is secured to the front mounting block by attachment means, such as machine screws. The plate prevents withdrawal of the nut from within depression 90. By permitting some tolerance in the dimensions of width and depth of the depression with respect to the nut, a loose but nondisengaging fit is established.

A journal 100 is rigidly secured to front mounting block 7 cavity 102 and by bolt 104. A further journal 106 is similarly attached to the front mounting block and extends therefrom. A rear mounting block 110 includes a passageway 112 for supporting a linear bearing 114 in sliding engagement with journal 100. Journal 106 is also slidably mounted within a linear bearing in rear mounting block 110. Pneumatic cylinder 80 is mounted in and secured to the rear mounting block by means such as a nut 120 disposed in a cavity 122 and engaging neck 124 of the cylinder.

Upon actuation of pneumatic cylinder 80, plunger 82 will be urged to extend, which extension is translated to front mounting block 78 and rollers A,B will be urged toward driving roller C. Rectilinear and equal transitional movement of rollers A and B is ensured by journals 100,106 being slidably engaged within their respective linear bearings. Furthermore, sufficient robustness is provided by front mounting block 78 and rear mounting block 110 to prevent bending or twisting of these components. Accordingly, rollers A and B are always equally extended from the rear mounting block.

As particularly depicted in FIG. 6, rear mounting block 110 rests upon and is rigidly attached to base plate 11 attached to band saw table 12. Front mounting block 78 is located above and in non contacting relationship with the base plate to permit unimpeded rectilinear translation of the front mounting block.

Driving roller C serves the primary function of transporting jig 22 therepast. A belt 130 extends about sprocket 132 and about each of idler sprockets 134,135. Between the idler sprockets, belt 130 bears against the cylindrical surface of driving pulley C to urge rotation of the driving pulley. Journals 138,140 rotatably support idler sprockets 134,136, respectively. A further journal 142 rotatably supports driving roller C.

Figure 7:
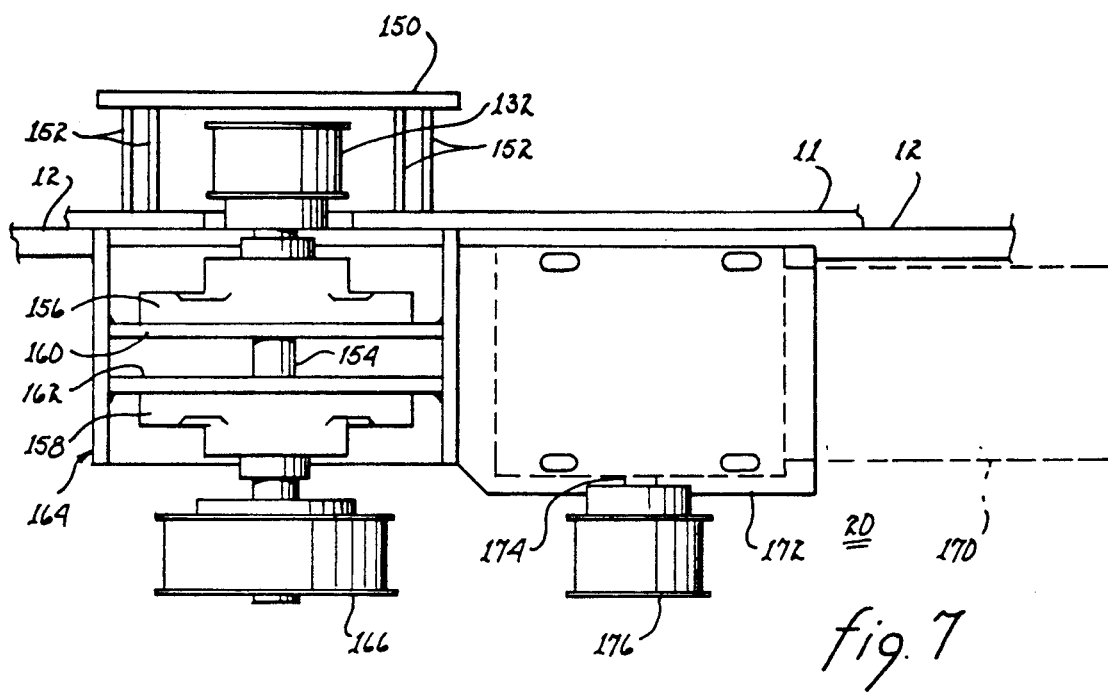
FIG. 7 is a side view illustrating the drive train of the driving roller.
Figure 8:
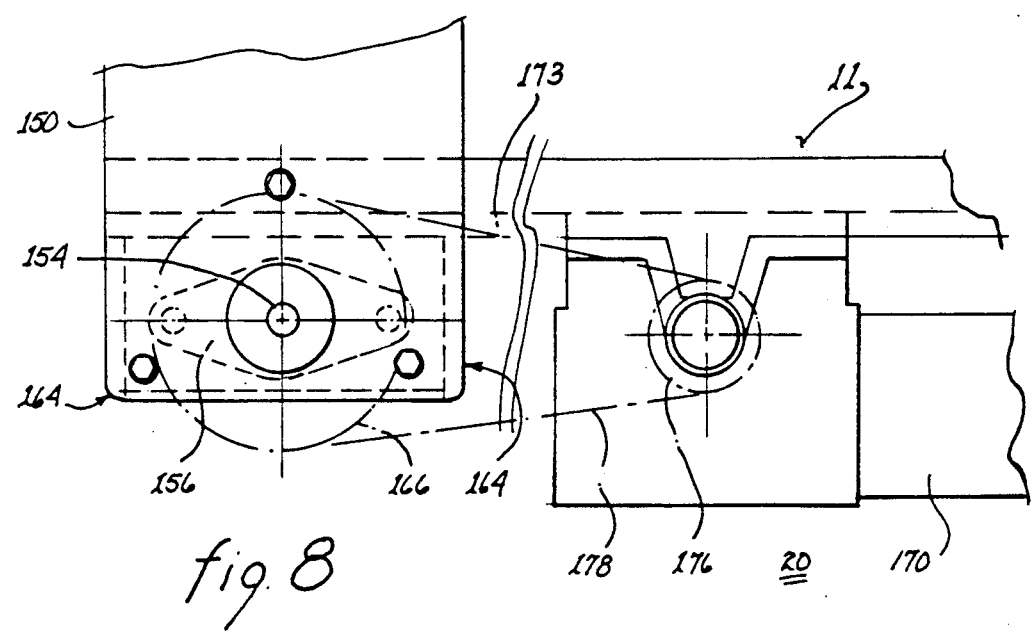
FIG. 8 is a partial top view illustrating a part of the drive train of the driving roller.

Referring jointly to FIGS. 6, 7 and 8, the support structure and motive power source for driving roller C will be described. A plate 150 is disposed above and protects belt sprocket 132, belt 130, idler sprockets 134,140 and a substantial part of driving roller C. A plurality of spacers 152 extend upwardly from base plate 11 to support plate 150. In this manner, the support plate serves both a protective function and as a structurally robust support for an overlying workpiece 24. A shaft 154 is journaled within flange bearings 156,158. These flange bearings are secured to suitably apertured plates 160,162, which plates form a part of substructure 164 secured to and extending downwardly from base plate 11. Shaft 154 rotatably supports and is secured to belt sprocket 132. The lower end of the shaft supports a belt sprocket 166.

Motive power, such as an electric motor 170 extends from and is secured to a gear box 172. The gear box is secured to and supported by a motor mount 173 extending from substructure 164. Alternatively, the motor mount may be directly attached to base plate 11. Gear box 172 includes an output shaft 174 supporting a belt drive sprocket 176. A belt 178 extends about and interconnects belt drive sprocket 176 with belt sprocket 166 to transfer power to and cause rotation of shaft 154 and drive belt sprocket 132.

It is to be understood that in certain applications, base plate 11 may be deleted and all components mounted thereon may be mounted directly upon work table 12. Furthermore, base plate 11 may be detachably attached to work table 12 or other structure of the band saw by conventional means.

A conventional source of electric power energizes electric motor 170. Furthermore, switches, whether automated or manually actuated, regulate the operation of the electric motor. These items are not illustrated as they are well known to those skilled in the art.

In summary, on energization of electrical motor 170, shaft 174 will rotate at a speed commensurate with the operational speed of electric motor 170 and the speed reduction provided by gear box 172. Belt drive sprocket 176, being connected to output shaft 174, will rotate and, via belt 178, rotate belt sprocket 166. Shaft 154 translates the rotary motion of belt sprocket 166 to belt sprocket 132. Belt 130, extending partially about belt sprocket 132, will translate about idler sprockets 134,140. Since driving roller C bears against and is in frictional contact with belt 130, translation of the belt will result in rotary motion of the driving roller. The driving roller, being in engagement with rear edge 32 of a jig 22, will impart a translatory motion to the jig.

Workpiece 24, being attached to jig 22, will translate past band saw blade 14 and a saw cut will be made therein.

Spring bias roller apparatus 18, bearing against front edge 30 of jig 22 through rollers A,B, will reorient the longitudinal axis of the jig about a vertical axis coincident with the band saw blade extending upwardly from work table 12. Such reorientation results because the urging or bias force imposed by the spring biased roller apparatus will cause a roller in contact with the front edge to push and reorient the jig until another segment of the front edge is brought into contact with the other roller; that is, the jig is reoriented automatically until both rollers A,B exert equal forces on different segments of the front edge. To effect or bring about such equalization, the jig is caused to rotationally translate about the opposing surface of driving roller C. Through such rotational translation, the cutting edge of the saw cut being made will continuously be maintained parallel and aligned with the band saw blade.

It may be noted that rear edge 32 may replicate the curvature of the front edge, have a curvature distinct and different from that of the front edge or be planar, without affecting operation of the present invention; only the curvature of the line being cut would be affected.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A jig and workpiece transport mechanism to be used with a band saw for reorienting a workpiece to maintain a segment of a saw line at the point of sawing parallel and aligned with a saw blade of the band saw, said mechanism comprising in combination:
    a) a jig having a rear edge and a curvilinear front edge defining a saw cut to be made in the workpiece;
    b) means for securing the workpiece to said jig;
    c) a driving roller mechanism in contact with the rear edge of said jig for transporting said jig and attached workpiece past the band saw blade; and
    d) a roller apparatus having a pair of spaced apart rollers disposed on opposed sides of the band saw blade and bearing against the front edge of said jig for urging rotational reorientation of said jig about said driving roller mechanism to rotationally reorient the workpiece in response to a change in curvature of the front edge of said jig during translation of the workpiece past the band saw blade and effect a saw cut in the workpiece conforming with the curvilinear front edge of said jig, said roller apparatus including means for biasing said roller apparatus toward said jig.

2. The apparatus as set forth in claim 1 wherein the rear edge of said jig acted upon by said driving roller mechanism is curvilinear.

3. The apparatus as set forth in claim 1 wherein said driving roller mechanism includes a driving roller bearing against the rear edge.

4. The apparatus as set forth in claim 3 wherein the rear edge of said jig replicates the curvature of the front edge and wherein said driving roller rolls along the rear edge.

5. The apparatus as set forth in claim 3 wherein the distances from the axis of rotation of said driving roller to the axis of rotation of each roller of said pair of rollers are equal.

6. The apparatus as set forth in claim 1 wherein said securing means includes means for clamping the workpiece to said jig.

7. The apparatus as set forth in claim 1 wherein said driving roller mechanism includes means for supporting the workpiece laterally of said jig during linear translation and rotational orientation of workpiece.

8. The apparatus as set forth in claim 7 including spacer means for positioning the workpiece above said jig.

9. The apparatus as set forth in claim 1 including a base plate for mounting said driving roller mechanism and said roller apparatus and for supporting said jig during reorientation of said jig.

10. A transport apparatus mountable upon a work table of a band saw for transporting a jig having a pair of edges and a workpiece attached to the jig past a saw blade of the band saw to make a saw cut in the workpiece commensurate with the jig, said apparatus comprising in combination:
    a) means adjacent to one edge of the jig for transporting the jig and attached workpiece past the saw blade;
    b) means for contacting the other edge of the jig, said contacting means including at least two contact points bearing against the other edge of the jig and resulting from the translation of the jig and attached workpiece in order to maintain the forces exerted by said contact points equal.

11. The apparatus as set forth in claim 10 wherein said transporting means includes a driving roller.

12. The apparatus as set forth in claim 11 including motive means for rotating said roller.

13. The apparatus as set forth in claim 12 wherein said motive means comprises a motor and a belt drive.

14. The apparatus as set forth in claim 13 wherein said driving roller includes a cylindrical surface and wherein said belt drive includes a belt in contact with said cylindrical surface.

15. The apparatus as set forth in claim 10 wherein said contacting means includes a pair of rollers for defining said contact points.

16. The apparatus as set forth in claim 15 wherein each of said rollers includes a cylindrical surface.

17. The apparatus as set forth in claim 15 wherein said reorienting means includes a mounting block for rotatably supporting each of said rollers.

18. The apparatus as set forth in claim 17 wherein said reorienting means includes means for urging said mounting block toward the jig to bring said rollers into engagement with the other edge.

19. A transport apparatus mountable upon a work table of a band saw for transporting a jig having a pair of edges and a workpiece attached to the jig past a saw blade of the band saw to make a saw cut in the workpiece commensurate with the jig, said apparatus comprising in combination:
    a) means adjacent to one edge of the jig for transporting the jig and attached workpiece past the saw blade;
    b) means for contacting the other edge of the jig, said contacting means including at least two rollers having cylindrical surfaces bearing against the other edge of the jig, one of said rollers being disposed on each side of an imaginary line extending through the saw blade and said transporting means;
    c) means for applying an essentially equal force upon the jig at each of said rollers to reorient the jig and attached workpiece commensurate with a change in curvature of the other edge resulting from the translation of the jig and attached workpiece in order to maintain the forces exerted by said rollers equal, including a mounting block for rotatably supporting each of said rollers and means for urging said mounting block toward the jig to bring said rollers into engagement with the other edge, said urging means comprising a pneumatic cylinder having a plunger attached to said mounting block and further including a pair of journals disposed in linear bearings for limiting movement of said rollers to rectilinear translation.

20. The apparatus as set forth in claim 19 wherein said rollers bear against the other edge.

21. The apparatus as set forth in claim 20 wherein the one edge is curved to replicate the curvature of the other edge.

22. A method for cutting a curvilinear edge in a workpiece with a saw blade of a band saw, said method comprising the steps of:
    a) attaching a workpiece to a jig having one edge defining the configuration of a saw cut to be made in the workpiece;
    b) transporting the jig and attached workpiece past the saw blade, said step of transporting including the step of applying a driving force to another edge of the jig;
    c) orienting the workpiece to align the configuration of the one edge of the jig adjacent the saw blade parallel with the saw blade prior to exercise of said step of transporting; and
    d) reorienting the workpiece during exercise of said step of transporting to prevent twisting the saw blade, said reorienting step including the step of applying essentially equal forces on the one edge of the jig at locations on opposed sides of the saw blade, which forces will reorient the jig commensurate with a change in curvature of the one edge of the jig as the jig is transported during said step of transporting.

23. The method as set forth in claim 22 wherein said step of transporting includes the step of translating the jig with rotating means in contact with the other edge.

24. The method as set forth in claim 23 wherein said step of reorienting includes the step of urging the jig toward the rotating means with the essentially equal forces being applied at the two locations.

25. The method as set forth in claim 24 wherein said step of attaching includes the step of clamping the workpiece to the jig.

26. The method as set forth in claim 25 wherein the workpiece extends from the jig and including the step of supporting the extending workpiece.

27. The method as set forth in claim 24 wherein said step of urging includes the step of applying a single force and implementing the single force essentially split between the two locations.

28. The method as set forth in claim 23 wherein said step of reorienting includes the step of maintaining the forces acting at each of the two locations essentially equal.

29. The method as set forth in claim 28 wherein said step of maintaining includes applying the force through a roller in contact with the jig at each of the locations on opposed sides of the saw blade.

30. The method as set forth in claim 29 wherein said step of maintaining further includes the step of urging rectilinear motion of the rollers toward the jig.

31. The method as set forth in claim 30 wherein the workpiece extends from the jig and including the step of supporting the extending workpiece.

32. The method as set forth in claim 29 wherein the other edge replicates the curvature of the one edge and wherein said step of transporting includes the step of transporting the jig in response to rotation of a driving roller.

* * * * *